Oct. 18, 1966
E. TALLMAN
3,279,759
TIGHTENER FOR LOAD TIES
Filed April 27, 1964
2 Sheets-Sheet 1
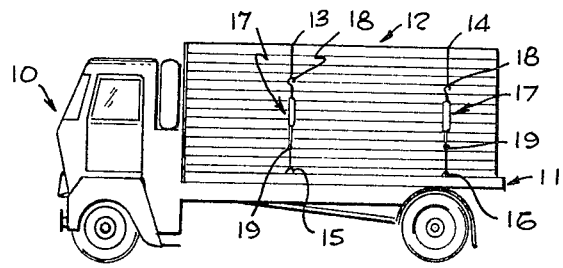
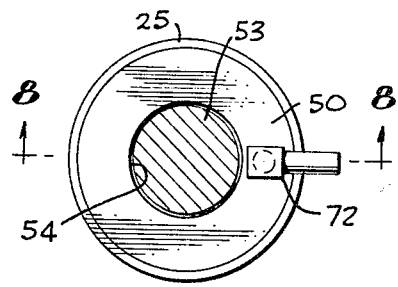
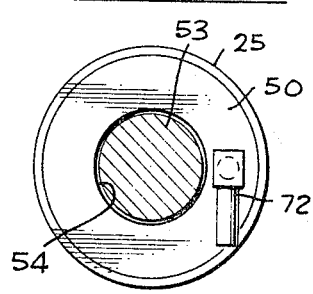
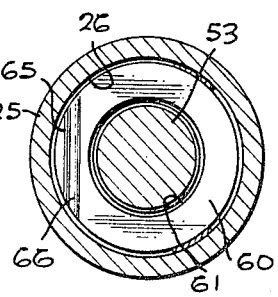
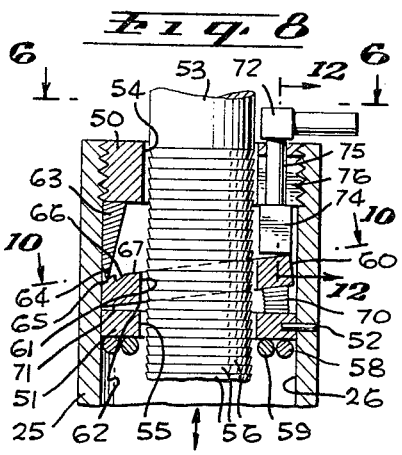
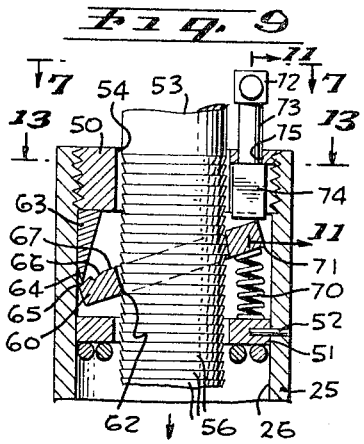
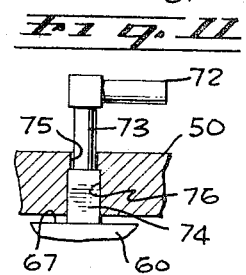
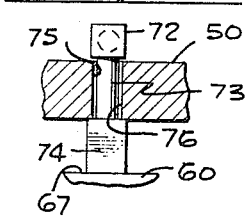
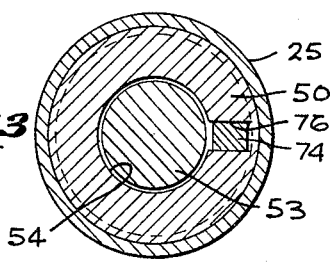
INVENTOR.
ERVEN TALLMAN
BY
Vernon D. Beehler
ATTORNEY Oct. 18, 1966  E. TALLMAN  3,279,759
TIGHTENER FOR LOAD TIES
Filed April 27, 1964  2 Sheets-Sheet 2
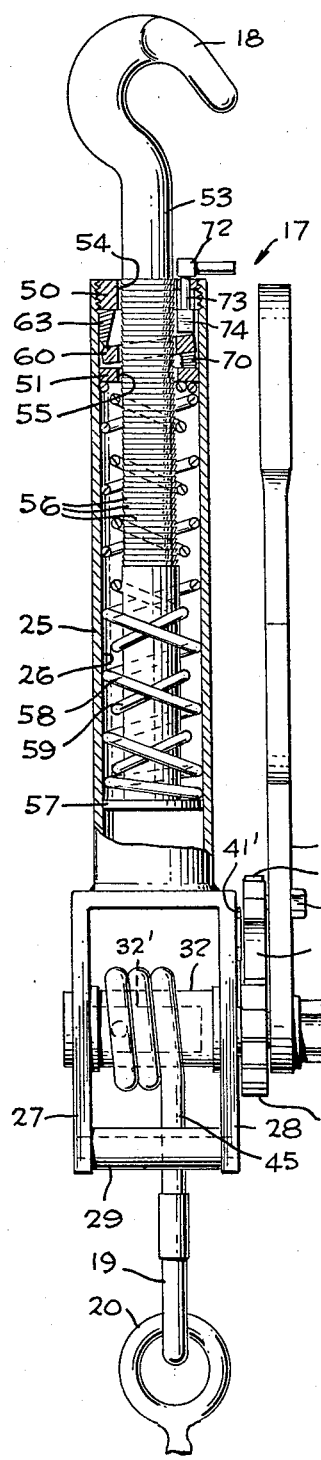
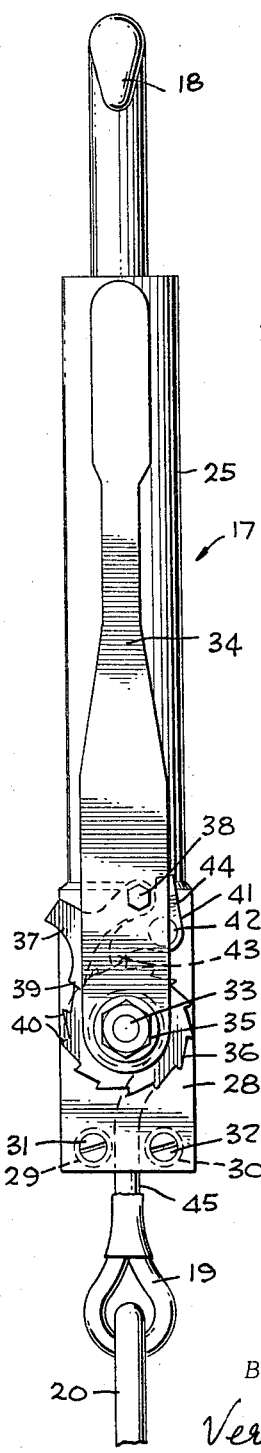
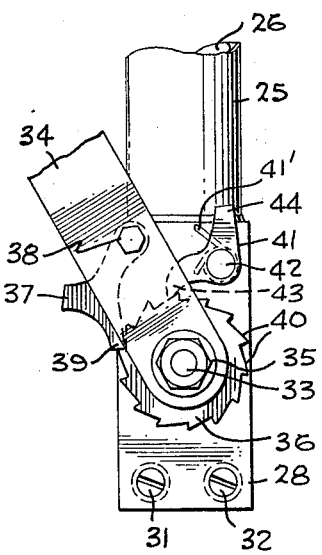
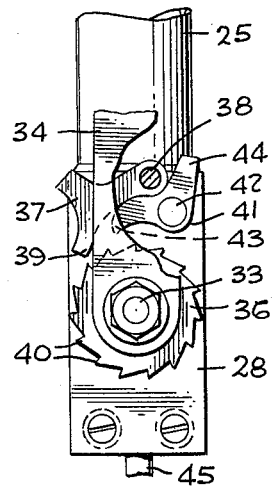
ERVEN TALLMAN
INVENTOR.
BY
Vernon D. Beehler
ATTORNEY

United States Patent Office 3,279,759
Patented Oct. 18, 1966

3,279,759
TIGHTENER FOR LOAD TIES
Erven Tallman, 6069 Saturn St., Los Angeles, Calif.
Filed Apr. 27, 1964, Ser. No. 362,831
4 Claims. (Cl. 254—165)

The invention relates to line tightening devices and is especially concerned with a tightening device by means of which slack in a line is automatically taken up and a set amount of tension maintained in the line. The invention has special utility in a tightener of the type which can be used in company with a rope or chain which is used to tie down heavy loads on a vehicle such as lumber, pipes, crates or in fact any kind of object which needs to be roped or chained to a vehicle and under circumstances where, as the vehicle jogs over a road, the rope or chain is apt to become loose enough to allow the load to be dislodged.

When tension is put upon a tie for holding down a load of any kind, especially where the load consists of a number of articles, considerable tension has to be exerted upon the line used for a tie to get it just as tight as possible. This is because as the load adjusts the tie is apt to become loose. All sorts of extra tightening devices have been made use of including drums having a ratchet and pinion take-up fastened to the vehicle itself. Irrespective of how tight the tie may be made initially, tension is bound to be relieved and the tie slackened as the load adjusts. To make a tie secure enough, tremendous tension needs to be placed upon the tie in advance, and this often puts such a strain upon the tie that it is apt to become broken as the load travels. Sometimes to insure against the possibility of breaking of the tie, extra heavy chains are made use of. Use of equipment too heavy for the load many times results in damaging the load by pulling too tightly upon the chain, or on the other hand, requires chains or other ties more heavy and expensive than the actual job warrants.

It is therefore among the objects of the invention to provide a new and improved tension maintenance device for a line which is capable of automatically taking up the slack in the line and maintaining a desired pre-set tension at all times.

Another object of the invention is to provide a new and improved device for taking up slack in a load tie which can avoid overtightening in the first instance and which is capable of maintaining a desired degree of tightness at all times.

Still another object of the invention is to provide a new and improved device for taking up the slack in a line and maintaining a desired amount of tension in the line, which is easily attached to the line and which is just as readily and easily released from the line when tension in the line is no longer needed.

Still another object of the invention is to provide a new and improved tension maintaining device for a line which has incorporated in it a tightening means and wherein both the tightening means and the tension maintaining means are easily released when no longer needed.

Further included among the objects of the invention is to provide a new and improved tension maintaining device by means of which slack is absorbed instantaneously by automatic operation of the device and where there is never any prospect of the line becoming slack while in motion and accordingly serving to prevent accidents which might be caused by dislodgment of a load during transit, the device further being one which is capable of being drawn up tighter at any time without release from its position.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side elevational view of a typical installation of the device on a load carried by an automobile truck.

FIGURE 2 is a longitudinal elevational view of the device partially broken away to show the interior construction.

FIGURE 3 is a side elevational view of the device showing a crank arm for tightening up the line.

FIGURE 4 is a fragmentary side elevational view of the device showing the crank arm in operation for tightening.

FIGURE 5 is a fragmentary side elevational view similar to FIGURE 4 wherein the crank arm operation has been released.

FIGURE 6 is a cross-sectional view on the line 6—6 of FIGURE 8.

FIGURE 7 is a cross-sectional view taken on the line 7—7 of FIGURE 9.

FIGURE 8 is a fragmentary longitudinal sectional view taken on the line 8—8 of FIGURE 6 showing the tension means in release position.

FIGURE 9 is a fragmentary longitudinal sectional view similar to FIGURE 8 but showing the tensioning means in tensioning position.

FIGURE 10 is an oblique cross-sectional view on the line 10—10 of FIGURE 8.

FIGURE 11 is a fragmentary longitudinal sectional view on the line 11—11 of FIGURE 9 showing the control handle for the tensioning means in tension maintaining position.

FIGURE 12 is a fragmentary longitudinal sectional view on the line 12—12 of FIGURE 8 showing the handle in tension release position.

FIGURE 13 is a cross-sectional view on the line 13—13 of FIGURE 9.

In an embodiment of the device which has been chosen primarily for the purpose of illustrating the substance of the invention, there is shown a truck 10 having a flat bed 11 upon which is mounted a load 12. Ties in the form of lines 13 and 14 are employed to hold forward and rearward portions of the load down in position upon the bed 11, the tie lines being in engagement with tie rings 15 and 16 fastened to the side of the bed. In each of the tie lines is the tightening and maintaining device of the invention indicated generally by the reference character 17. The tightening and tensioning device 17 is shown in the side elevational view on an enlarged scale in FIGURE 3 and also in FIGURE 2 where a portion of the casing is broken away to reveal the interior construction. A hook 18 at the top is adapted to engage in a loop of the tie line if it chances to be a rope or wire cable or in a link if it chances to be a chain. At the lower end is an eyelet 19 to which is attached a ring 20 which can be the upper end of a hook or any other convenient conventional means by means of which the device can be attached to whatever the tie line chances to be.

The device includes a tubular casing 25 which has preferably a smooth inner cylindrical wall 26. At the lower end of the casing 25 is a bracket consisting of opposite parallel legs 27, 28, intermediate lower ends of which are spreaders 29 and 30 through which pass bolts 31 and 32 which hold the lower ends of the legs in position. A drum 32 is rotatably mounted between the legs, and an internal spring 32′ acts in a substantially conventional fashion causing the drum 32 to rotate and take up slack when needed. A crank arm 34 is nonrotatably attached to the drum 32 by means of a nut 35. Also nonrotatably mounted upon the drum 32 is a pinion 36.

Pivotally secured to the crank arm 34 is a driving ratchet arm 37, the driving ratchet arm being pivotally attached to the crank arm by means of a bolt 38. A ratchet point 39 on the ratchet arm 37 engages teeth 40 of the pinion 36. A spring loaded stop ratchet arm 41 urged by a substantially convenional torsion spring 41' acting as a pawl is pivotally secured by means of a pin 42 to the leg 28. A point 43 on the ratchet arm 41 also engages the teeth 40. Also on the ratchet arm 41 is an extension 44 extending upwardly as shown in FIGURES 3, 4 and 5 past the bolt 38 by means of which the driving ratchet arm 37 is mounted upon the crank arm 34. A cable 45 is anchored to and extends around the drum 32, the cable terminating downwardly in the eyelet 19 already made reference to. It will be clear from the description of parts that when the tie line to which the device 17 is attached is to be tightened, this is accomplished by cranking on the crank arm 34, moving it in a counter-clockwise direction as viewed in FIGURES 3, 4 and 5. During this movement the driving ratchet arm engages the teeth 40 of the pinion 36 causing the drum 32 to rotate in a corresponding counter-clockwise direction and take up on the cable 45. This ratcheting action is substantially conventional. The stop ratchet arm 41 serves also in a well known fashion to hold the pinion in tensioned position as the crank arm 34 is rotated to a slight extent clockwise to a new gripping position.

Conversely, when the cable is to be released, the crank arm 34 is shifted to a greater degree in a clockwise direction as viewed in FIGURES 3, 4 and 5. When this is done, the portion of the drive ratchet arms 37 which surrounds the bolt 38 is pushed against the extension 44 of the stop ratchet arm 41 causing it to be tilted in a clockwise direction and forcing the point 43 to a position of disengagement from the teeth 40. When this happens, the drum 32 is freed and tension is released upon the cable 45 and the appropriate attached tie line.

For taking up slack and maintaining tension on the tie line, mechanism is provided, located within the tubular casing 25. The mechanism is held within the interior of the casing by a bushing 50 anchored by means of a threaded engagement with the upper end of the casing as viewed in FIGURES 2, 3, 8 and 9. Spaced axially inwardly from the bushing 50 is a collar 51 anchored to the cylindrical interior wall surface of the tubular casing 25, as for example by means of a pin 52. A plunger 53 attached to the hook 18 extends through an opening 54 in the bushing 50 and through a similar opening 55 in the collar 51 far into the interior of the casing 25. It is of importance to note that a substantial portion of the length of the plunger 53 is provided with circumferentially extending obstructions or obstructing teeth 56 which point outwardly toward the end of the casing into which the plunger 53 extends. At the innermost end of the plunger is a flange 57 which forms a keeper for a compression spring element consisting of an outer spiral spring 58 and an inner spiral reversely wound spring 59. The upper ends of the springs 58 and 59 bottom upon the inner side of the collar 51. Within the space between the bushing 50 and the collar 51 is mounted a stop ring 60 having a somewhat oblique central passage 61 therethrough. The central passage forms a relatively sharp corner 62. Located on one side, namely the left side as viewed in FIGURES 8 and 9, is a fulcrum element 63. This fulcrum element extends axially inwardly and terminates in a wedge shaped end 64. The wedge shaped end extends outwardly a short distance from the cylindrical wall surface of the casing 25. Depressions 65, 66 in a face 67 of the stop ring are located in positions of potential engagement with the wedge shaped end 64. It will be noted that these depressions have outwardly sloping walls down which the wedge shaped end 64 tends to ride in the position of parts shown in FIGURE 9.

Diametrically opposite the wedge shaped end 64 is a spring 70. At its inner end the spring engages the collar 51, and at its outer end of the spring engages the adjacent face 71 of the stop ring 60. The spring is biased in a direction tending to lift the stop ring away from a position adjacent the collar 51, as shown in FIGURE 9.

To control the displacement of the stop ring 60 there is provided a control handle 72, nonrotatably fastened to a shank 73, having an inner end 74 of rectangular cross-sectional shape. The shank 73 is adapted to rotate in an outer round opening 75. Inwardly, relative to the round opening 75, is a rectangular opening 76. The breadth of the rectangular opening 76 is less than the long dimension of the rectangular inner end 74 so that the rectangular inner end 74 can enter the rectangular opening 76 only in the tension control position of FIGURES 7, 9, 11 and 13. When the control handle 72 is in the tension release position of FIGURES 2, 6, 8 and 12, the shank 73 is extended inwardly until the rectangular inner end 74 clears the rectangular opening 76 and then is rotated 90 degrees so that, the corresponding dimension of the rectangular inner end 74 being greater than the width of the rectangular opening 76, the shank and accordingly the handle are held in the inwardly extended position shown to good advantage in FIGURES 8 and 12 thereby minimizing the degree of tilt of the stop ring 60 and at the same time compressing the spring 70 to the position shown in FIGURE 8.

To operate the device, the control handle 72 is set in the tension release position of FIGURES 2, 6, 8 and 11. The hook 18 is then engaged with one end of a respective tie line, as for example the tie line 13, and the eyelet 19 and ring 20 is engaged with the other end of the same tie line. The tie line is then tightened by manipulation of the crank arm 34 and its ratchet action which rotates the drum 32, tightening the tie line to a maximum extent. This causes a maximum compression of the springs 58 and 59, and at the same time the plunger 53 extends outwardly with respect to the casing 25 to the maximum extent. After the tightening operation is completed, the control handle 72 is then rotated to the tension control position of FIGURES 7, 9, 11 and 13. This allows the stop ring to tilt to the maximum extent by operation of the spring 70, the stop ring tilting about the wedge shaped end 64 as a fulcrum. At the same time, the sharp corner 62 is tilted into engagement with one of the obstructing teeth 56 which surround that portion of the plunger 53. Thereafter, whenever there is a slackening of the tie line 13, the plunger 52 can move to that extent inwardly into the casing 25, this movement being the result of expanding spring pressure of spring tension built up in the springs 58 and 59. To whatever extent the plunger 53 moves into the casing 25 under this slack condition, the sharp corner 62 will immediately engage the next adjacent obstructing tooth 56 and anchor the plunger in the new position, thus maintaining the newly tensioned position of the tie line. The amount of tension, of course, will continue to be substantially the same inasmuch as this is controlled by the inherent strength of the springs 58 and 59.

Thereafter, should there be another slackening to a greater degree of the tie line, the plunger 53 will then enter still further into the casing 25, and in this subsequent new position, the sharp corner 62 will then engage the then adjacent obstructing tooth 56 which has advanced to the appropriate location by inward movement of the plunger 53, and again the new position of the plunger will be anchored by this action, thereby taking up the new slack and again maintaining the preset tension on the tie line. This taking up of slack and maintaining of each newly occupied position of the plunger 53 continues over and over again as the load travels along until all of the slack has been taken up. As a practical matter, the plunger 53 is made of such length, or in any event the obstructing teeth extend throughout a distance such that as a result of experience it has been found sufficient to take up slack in virtually all normal conditions of loading. Even if all of the slack take-up provided in the device be used up during the course of partial transit of the load, the device can again be tightend without removal from the tie line by cranking upon the crank arm 34, thus to reset the device after which it will continue to automatically take up slack in the same manner as has heretofore been described.

When transit is complete, and it is desired to release tension, the crank arm 34 is rotated as previously described in a clockwise direction as viewed in FIGURES 3 and 5, thus to disengage the ratchet arms and release the cable 45. When this is accomplished, the springs 58 and 59 expand and pull the plunger 53 to its innermost position within the casing 25. The device is then ready for reapplication to a new load.

I claim:

1. A device for taking up slack and maintaining tension in a line comprising a tubular casing having an interior wall, a bushing at one end of the casing having a central opening, a plunger in said casing having one end extending slidably outwardly through said bushing and a line engaging means on said end, and circumferentially extending outwardly facing obstruction means on said plunger intermediate said ends, a spring keeper fixed to the interior wall at a location spaced axially inwardly from said bushing and spring means acting between said keeper and said plunger biased in a direction urging said plunger into said casing, line engaging means on the end of said casing remote from said bushing, and releasable means adjustably securing said plunger in said casing comprising an axially inwardly extending fulcrum element located between said bushing and said keeper on one side of said casing, a stop member around said plunger on the side of said spring keeper opposite from said spring, said stop member having one side in engagement with said fulcrum element, means in engagement with said stop member biasing said stop member to operative position and a control handle having one position relative to the stop member wherein said stop member is in a position out of engagement with the obstruction means on the plunger and having another position shifted axially relative to said stop member wherein said stop member is moved into engagement with the obstruction means on said plunger.

2. A device for taking up slack and maintaining tension in a line comprising a tubular casing having an interior wall, a bushing at one end of the casing having a central opening, a plunger in said casing having one end extending slidably outwardly through said bushing and a line engaging means on said end, and circumferentially extending axially outwardly facing obstruction means on said plunger intermediate said ends, a collar fixed to the interior wall at a location spaced axially inwardly from said bushing and a coiled spring acting between said collar and said plunger, a line engaging means on the end of said casing remote from said bushing, and releasable means adjustably securing said plunger in said casing comprising an axially inwardly extending fulcrum element located between said bushing and said collar on one side of said casing and on the side of said collar opposite from said coiled spring, a stop ring around said plunger in engagement at one edge thereof with said fulcrum element, a spring means in engagement with said stop ring biased in a direction urging said stop member to operative position and a control handle having a position in engagement with stop ring adapted to release tension in said line wherein said stop ring is in a position out of engagement with the obstruction on the plunger and a position removed axially from said stop ring adapted to effect tension in said line wherein said stop ring is tilted by action of said last identified spring into engagement with the obstruction means on said plunger.

3. A device for taking up slack and maintaining tension in a line comprising a tubular casing having a smooth interior wall, a bushing at one end of the casing having a central opening, a plunger in said casing having one end extending slidably outwardly through said bushing and a line engaging means on said end, a flange at the other end of said plunger and circumferentially extending axially outwardly facing obstructions on said plunger intermediate said ends, a collar surrounding said plunger and fixed to the interior wall at a location spaced axially inwardly from said bushing and a coiled spring acting between said collar and said flange, an adjustable line tightening attachment on the end of said casing remote from said bushing and releasable means adjustably securing said plunger in said casing comprising an axially inwardly extending fulcrum element located between said bushing and said collar on one side of said casing, a stop ring around said plunger on the side of said collar opposite said spring, said stop ring having one face in engagement at one edge thereof with said fulcrum element, a spring between the other face of said stop ring and said collar on the side of said collar diametrically opposite said fulcrum element and a control comprising a rotatable handle exterior relative to said casing and a shank extending axially into said casing, said shank having a first position of rotation extended axially inwardly into engagement with stop ring adapted to release tension on said line wherein said stop ring is in one position out of engagement with the obstructions on the plunger and another position of rotation extended axially outwardly from said stop ring adapted to effect the application of tension wherein said stop ring is tilted by spring action into engagement with obstructions on said plunger whereby to allow inward movement of the plunger and block outward movement of the plunger.

4. A device for taking up slack and maintaining tension in a line comprising a tubular casing having an interior wall, a bushing at one end of the casing having a central opening, a plunger in said casing having one end extending slidably outwardly through said bushing and a line engaging means on said end, releasable means in said casing adapted to take up slack in the line comprising a series of axially spaced circumferentially extending axially outwardly facing obstructions on said plunger intermediate said ends, a spring keeper fixed to the interior wall at a location spaced axially inwardly from said bushing, a spring acting between said keeper and said plunger, a control having one position productive of engagement of said plunger with said casing and another position productive of release of said plunger from said casing, said control means comprising a fulcrum between said bushing and said keeper, a tilting stop member extending around said plunger on the side of said keeper opposite said spring and in engagement with said fulcrum, and a control handle having one position against said stop member holding said stop member in a position of disengagement with said plunger, said control handle having another position axially removed from said one position wherein said stop member is in another position of tilted engagement with at least one of said obstructions whereby said plunger is blocked against tension releasing movement but not against movement in the opposite direction, and an adjustable separate line take-up attachment on the end of said casing remote from said bushing, said attachment comprising a bracket, a drum rotatably mounted on said bracket on an axis normal to the axis of the casing, a crank arm rotatably attached to said drum, a pinion nonrotatably attached to said drum, a driving ratchet arm pivotally mounted on said crank arm and in driving engagement with said pinion, a stop ratchet arm pivotally mounted on said bracket and in stopping engagement with said pinion, a portion of said driving ratchet arm having a position of engagement with an extension of said stop ratchet arm on the side thereof opposite the pinion upon reverse rotation of said crank arm, said engagement being productive of release of said pinion whereby to release said tension in the line.

(References on following page)

References Cited by the Examiner

UNITED STATES PATENTS

| | | | |
|---|---|---|---|
| 310,845 | 1/1885 | Overbagh | 254—161 |
| 606,760 | 7/1898 | Heisey | 254—164 |
| 879,964 | 2/1908 | Hogue | 254—165 |
| 2,907,598 | 10/1959 | Hart | 248—355 |

FOREIGN PATENTS

| | | |
|---|---|---|
| 642,687 | 3/1937 | Germany. |
| 156,360 | 1/1921 | Great Britain. |
| 722,819 | 2/1955 | Great Britain. |

EVON C. BLUNK, *Primary Examiner.*

HUGO O. SCHULZ, *Examiner.*

H. C. HORNSBY, *Assistant Examiner.*